(12) United States Patent
Hua et al.

(10) Patent No.: US 11,327,668 B1
(45) Date of Patent: May 10, 2022

(54) PREDICTABLE MEMBER ASSIGNMENT FOR EXPANDING FLEXIBLE RAID SYSTEM

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 14 days.

(21) Appl. No.: 17/148,814

(22) Filed: Jan. 14, 2021

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0659* (2013.01); *G06F 3/0689* (2013.01)

(58) Field of Classification Search
CPC .... G06F 3/0631; G06F 3/0604; G06F 3/0653; G06F 3/0659; G06F 3/0689
See application file for complete search history.

(56) References Cited

U.S. PATENT DOCUMENTS

| | | | | |
|---|---|---|---|---|
| 5,258,984 A | * | 11/1993 | Menon | G06F 11/1076 714/6.32 |
| 7,120,826 B2 | * | 10/2006 | Fore | G06F 3/0601 714/6.2 |
| 2017/0315745 A1 | * | 11/2017 | Agombar | G06F 3/0689 |

* cited by examiner

*Primary Examiner* — Masud K Khan
(74) *Attorney, Agent, or Firm* — Anderson Gorecki LLP

(57) ABSTRACT

A flexible RAID system can expand by iteratively adding disks to a disk cluster. The disks may be added individually or in groups. Spare capacity is distributed over multiple disks within a cluster. Clusters are created, grown, and divided with predictable RAID member distribution patterns. Cluster validation is performed based on the patterns.

20 Claims, 21 Drawing Sheets

| Disk \ Split | 0 | 1 | 2 | 3 | 4 |
|---|---|---|---|---|---|
| 0 | 0A | 0B | 0C | 0D | 0E |
| 1 | 1A | 1B | 1C | 1D | 1E |
| 2 | 2A | 2B | 2C | 2D | 2E |
| 3 | 3A | 3B | 3C | 3D | 3E |
| 4 | 4A | 4B | 4C | 4D | 4E |

Non-Growable R0 Cluster
400

Figure 4

| Disk \ Split | 0 | 1 | 2 | 3 | 4 |
|---|---|---|---|---|---|
| 0 | 0A | 0B | 0C | 0D | 0E |
| 1 | 1A | 1B | 1C | 1D | X |
| 2 | 2A | 2B | 2C | X | 2E |
| 3 | 3A | 3B | X | 3D | 3E |
| 4 | 4A | X | 4C | 4D | 4E |
| 5 | X | 4B | 3C | 2D | 1E |

Non-Growable R1 Cluster
402

Figure 5

| Disk \ Split | 0 | 1 | 2 | 3 | 4 |
|---|---|---|---|---|---|
| 0 | 0A | 0B | 0C | 0D | 0E |
| 1 | 1B | 1C | 1D | 1E | 1A |
| 2 | 2C | 2D | 2E | 2A | 2B |
| 3 | 3D | 3E | 3A | 3B | 3C |
| 4 | 4E | 4A | 4B | 4C | 4D |

Minimal Mode 1 Growable Cluster
With W Disks
404

Figure 6

| Disk \ Split | 0 | 1 | 2 | 3 | 4 |
|---|---|---|---|---|---|
| 0 | 0F | 0G | 0H | 0D | 0E |
| 1 | 1F | 1G | 1H | 1E | 1A |
| 2 | 2F | 2G | 2H | 2A | 2B |
| 3 | 3F | 3G | 3H | 3B | 3C |
| 4 | 4F | 4G | 4H | 4C | 4D |
| 5 | 0A | 1B | 2C | 3D | 4E |
| 6 | 0B | 1C | 2D | 3E | 4A |
| 7 | 0C | 1D | 2E | 3A | 4B |

Mode 1 Growable Cluster
With W+3 Disks
406

Figure 8

| Disk \ Split | 0 | 1 | 2 | 3 | 4 |
|---|---|---|---|---|---|
| 0 | 0A | 1B | 2C | 3D | 4E |
| 1 | 0B | 1C | 2D | 3E | 4A |
| 2 | 0C | 1D | 2E | 3A | 4B |
| 3 | 0D | 1E | 2A | 3B | 4C |
| 4 | 0E | 1A | 2B | 3C | 4D |

Minimal Mode 2 Growable Cluster
With W Disks
408

Figure 9

| Disk \ Split | 0 | 1 | 2 | 3 | 4 |
|---|---|---|---|---|---|
| 0 | 0F | 0G | 0H | 3D | 4E |
| 1 | 1F | 1G | 1H | 3E | 4A |
| 2 | 2F | 2G | 2H | 3A | 4B |
| 3 | 3F | 3G | 3H | 3B | 4C |
| 4 | 4F | 4G | 4H | 3C | 4D |
| 5 | 0A | 0B | 0C | 0D | 0E |
| 6 | 1B | 1C | 1D | 1E | 1A |
| 7 | 2C | 2D | 2E | 2A | 2B |

Mode 2 Growable Cluster
With W+3 Disks
410

Figure 10

| Disk \ Split | 0 | 1 | 2 | 3 | 4 |
|---|---|---|---|---|---|
| 0 | 0E | 0A | 0B | 0C | 0D |
| 1 | 1E | 1B | 1C | 1D | X |
| 2 | 2E | 2C | 2D | X | 2A |
| 3 | 3E | 3D | X | 3A | 3B |
| 4 | 4E | X | 4A | 4B | 4C |
| 5 | X | 1A | 2B | 3C | 4D |

Minimal Growable Cluster With Spare
(W+1 Disks)
412

Figure 11

| Disk \ Split | 0 | 1 | 2 | 3 | 4 |
|---|---|---|---|---|---|
| 0 | 0E | 0F | 0B | 0C | 0D |
| 1 | 1E | 1F | 1C | 1D | X |
| 2 | 2E | 2F | 2D | X | 2A |
| 3 | 3E | 3F | X | 3A | 3B |
| 4 | 4E | X | 4A | 4B | 4C |
| 5 | X | 1A | 2B | 3C | 4D |
| 6 | 0A | 1B | 2C | 3D | 4F |

Growable Cluster With Spare
(W+1+1 Disks)
414

Figure 12

| Disk \ Split | 0 | 1 | 2 | 3 | 4 |
|---|---|---|---|---|---|
| 0 | 0E | 0F | 0G | 0H | 0I |
| 1 | 1E | 1F | 1G | 1H | X |
| 2 | 2E | 2F | 2G | X | 2I |
| 3 | 3E | 3F | X | 3H | 3I |
| 4 | 4E | X | 4G | 4H | 4I |
| 5 | X | 1A | 2B | 3C | 4D |
| 6 | 0A | 1B | 2C | 3D | 4F |
| 7 | 0B | 1C | 2D | 3G | 4A |
| 8 | 0C | 1D | 2H | 3A | 4B |
| 9 | 0D | 1I | 2A | 3B | 4C |

Growable Cluster With Spare
(2*W Disks)
416

Figure 13

| Disk \ Split | 0 | 1 | 2 | 3 | 4 |
|---|---|---|---|---|---|
| 5 (0) | 0K | 1A | 2B | 3C | 4D |
| 6 (1) | 1K | 1B | 2C | 3D | 4J |
| 7 (2) | 2K | 1C | 2D | 3J | 4A |
| 8 (3) | 3K | 1D | 2J | 3A | 4B |
| 9 (4) | 4K | 1J | 2A | 3B | 4C |
| 11 | 0J | 0A | 0B | 0C | 0D |

Mode 2 Growable Cluster
With W+1 Disks
424

Figure 15

| Disk \ Split | 0 | 1 | 2 | 3 | 4 |
|---|---|---|---|---|---|
| 5 | 0K | 0L | 0M | 0N | 0O |
| 6 | 1K | 1L | 1M | 1N | 1O |
| 7 | 2K | 2L | 2M | 2N | 2O |
| 8 | 3K | 3L | 3M | 3N | 3O |
| 9 | 4K | 4L | 4M | 4N | 4O |
| 11 | 0J | 0A | 0B | 0C | 0D |
| 12 | 1A | 1B | 1C | 1D | 1J |
| 13 | 2B | 2C | 2D | 2J | 2A |
| 14 | 3C | 3D | 3J | 3A | 3B |
| 15 | 4D | 4J | 4A | 4B | 4C |

Mode 2 Growable Cluster
With 2*W Disks
426

Figure 16

| Disk \ Split | 0 | 1 | 2 | 3 | 4 |
|---|---|---|---|---|---|
| 5 | 0K | 0L | 0M | 0N | 0O |
| 6 | 1K | 1L | 1M | 1N | 1O |
| 7 | 2K | 2L | 2M | 2N | 2O |
| 8 | 3K | 3L | 3M | 3N | 3O |
| 9 | 4K | 4L | 4M | 4N | 4O |

Non-Growable R0 Cluster
428

| Disk \ Split | 0 | 1 | 2 | 3 | 4 |
|---|---|---|---|---|---|
| 11 (0) | 0J | 0A | 0B | 0C | 0D |
| 12 (1) | 1A | 1B | 1C | 1D | 1J |
| 13 (2) | 2B | 2C | 2D | 2J | 2A |
| 14 (3) | 3C | 3D | 3J | 3A | 3B |
| 15 (4) | 4D | 4J | 4A | 4B | 4C |

Mode 1 Growable Cluster
With W Disks
430

Figure 17

PREDICTABLE MEMBER ASSIGNMENT FOR EXPANDING FLEXIBLE RAID SYSTEM

TECHNICAL FIELD

The subject matter of this disclosure is generally related to electronic data storage, and more particularly to predictably distributing protection group members while increasing the number of disks in a storage array and validating disk clusters based on the predictable manner in which protection group members are distributed.

BACKGROUND

The disk drives in a typical enterprise data storage system are members of a protection group known as a redundant array of independent disks (RAID). A RAID protection group helps to avoid data loss by enabling a failed protection group member to be reconstructed. For example, a failed protection group member can be rebuilt on a spare disk using the remaining non-failed members. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails. A variety of different RAID levels with different numbers and types of members are known. A typical data storage system includes multiple RAID protection groups of the same level with individual disks as protection group members.

Most data storage systems enable storage capacity to be increased to accommodate a greater amount of data by adding new disks. The storage capacity of a data storage system that uses individual disks as RAID protection group members is typically increased by adding W new disks for a RAID (D+P) implementation where W=(D+P). For example, a storage system that implements RAID-5 (4+1) may be scaled-up in increments of five new disks. Similarly, a RAID-5 (3+1) may be scaled-up in increments of four new disks. However, as the storage capacity of individual disk drives increases because of technological advances an increment of W new disks may be undesirably large and inefficient.

SUMMARY

In accordance with some aspects an apparatus comprises a storage array comprising at least one compute node comprising at least one processor and non-transitory computer-readable memory; a plurality of data storage disks that are accessed by the at least one compute node and used to store data that is accessed via the at least one compute node, each disk having W indexed splits, each split having a fixed-size amount of storage capacity equal to storage capacity of other splits; and a disk manager configured to: create a growable disk cluster with spare from W+1 numbered ones of the disks by creating redundant arrays of independent disks (RAID) protection groups each having D+P=W numbered RAID protection group members comprising D data members and P parity members, and distributing the protection group members in one of the following modes: mode 1: member numbers match disk ordinals on the first W disks and member numbers match split indices on other disks and those splits that do not contain one of the protection group members are designated as spare splits and for each additional disk that is added to the mode 1 pattern in ordered succession the members of the first W disks at the lowest numbered unrotated split index are rotated onto the additional disk such that the protection group member at disk n is moved to split n of the additional disk; and mode 2: for members on the first W disks, if the split index is less than a number of additional disks greater than W then the member number matches the disk ordinal, and otherwise the member number matches the split index; and for members on other disks, the member number is the disk ordinal modulo RAID width; and designating as spare splits those splits that do not contain one of the protection group members; grow the growable disk cluster with spare by adding new ones of the disks and rotating members at lowest numbered unrotated split indices onto the new disks; and validate the growable disk cluster with spare by determining that the member numbers match one of the patterns.

In accordance with some aspects a method implemented by a storage array comprising at least one compute node comprising at least one processor and non-transitory computer-readable memory and a plurality of data storage disks that are accessed by the at least one compute node and used to store data that is accessed via the at least one compute node, each disk having W indexed splits, each split having a fixed-size amount of storage capacity equal to storage capacity of other splits, comprises: creating a growable disk cluster with spare from W+1 numbered ones of the disks by creating redundant arrays of independent disks (RAID) protection groups each having D+P=W numbered RAID protection group members comprising D data members and P parity members, and distributing the protection group members in one of the following modes: mode 1: member numbers match disk ordinals on the first W disks and member numbers match split indices on other disks and those splits that do not contain one of the protection group members are designated as spare splits and for each additional disk that is added to the mode 1 pattern in ordered succession the members of the first W disks at the lowest numbered unrotated split index are rotated onto the additional disk such that the protection group member at disk n is moved to split n of the additional disk; and mode 2: for members on the first W disks, if the split index is less than a number of additional disks greater than W then the member number matches the disk ordinal, and otherwise the member number matches the split index; and for members on other disks, the member number is the disk ordinal modulo RAID width; and designating as spare splits those splits that do not contain one of the protection group members; growing the growable disk cluster with spare by adding new ones of the disks and rotating members at lowest numbered unrotated split indices onto the new disks; and validating the growable disk cluster with spare by determining that the member numbers match one of the patterns.

In accordance with some aspects a computer-readable storage medium stores instructions that when executed by a storage array comprising at least one compute node comprising at least one processor and non-transitory computer-readable memory and a plurality of data storage disks that are accessed by the at least one compute node and used to store data that is accessed via the at least one compute node, each disk having W indexed splits, each split having a fixed-size amount of storage capacity equal to storage capacity of other splits, cause the compute node to perform a method for creating and validating disk clusters, the method comprising: creating a growable disk cluster with spare from W+1 numbered ones of the disks by creating redundant arrays of independent disks (RAID) protection groups each having D+P=W numbered RAID protection group members comprising D data members and P parity members, and distributing the protection group members in one of the following modes: mode 1: member numbers match disk ordinals on the first W disks and member numbers match split indices on other disks and those splits that do not contain one of the protection group members are designated as spare splits and for each additional disk that is added to the mode 1 pattern in ordered succession the members of the first W disks at the lowest numbered unrotated split index are rotated onto the additional disk such that the protection group member at disk n is moved to split n of the additional disk; and mode 2: for members on the first W disks, if the split index is less than a number of additional disks greater than W then the member number matches the disk ordinal, and otherwise the member number matches the split index; and for members on other disks, the member number is the disk ordinal modulo RAID width; and designating as spare splits those splits that do not contain one of the protection group members; growing the growable disk cluster with spare by adding new ones of the disks and rotating members at lowest numbered unrotated split indices onto the new disks; and validating the growable disk cluster with spare by determining that the member numbers match one of the patterns.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIG. 4 illustrates a non-growable R0 cluster.

FIG. 5 illustrates a non-growable R1 cluster.

FIG. 6 illustrates a minimal mode 1 growable cluster with W disks.

FIG. 8 illustrates a mode 1 growable cluster grown to W+3 disks.

FIG. 9 illustrates a minimal mode 2 growable cluster with W disks.

FIG. 10 illustrates a mode 2 growable cluster grown to W+3 disks.

FIG. 11 illustrates a minimal mode 1 growable cluster with spare with W+1 disks.

FIG. 12 illustrates a mode 1 growable cluster with spare grown to W+1+1 disks.

FIG. 13 illustrates a mode 1 growable cluster with spare grown to 2*W disks.

FIG. 15 illustrates a mode 2 growable cluster with W+1 disks.

FIG. 16 illustrates a mode 2 growable cluster with 2*W disks.

FIG. 17 illustrates a non-growable R0 cluster and mode 1 growable cluster with W disks resulting from cluster division.

DETAILED DESCRIPTION

The terminology used in this disclosure is intended to be interpreted broadly within the limits of subject matter eligibility. The terms "disk" and "drive" are used interchangeably to refer to non-volatile storage media but are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
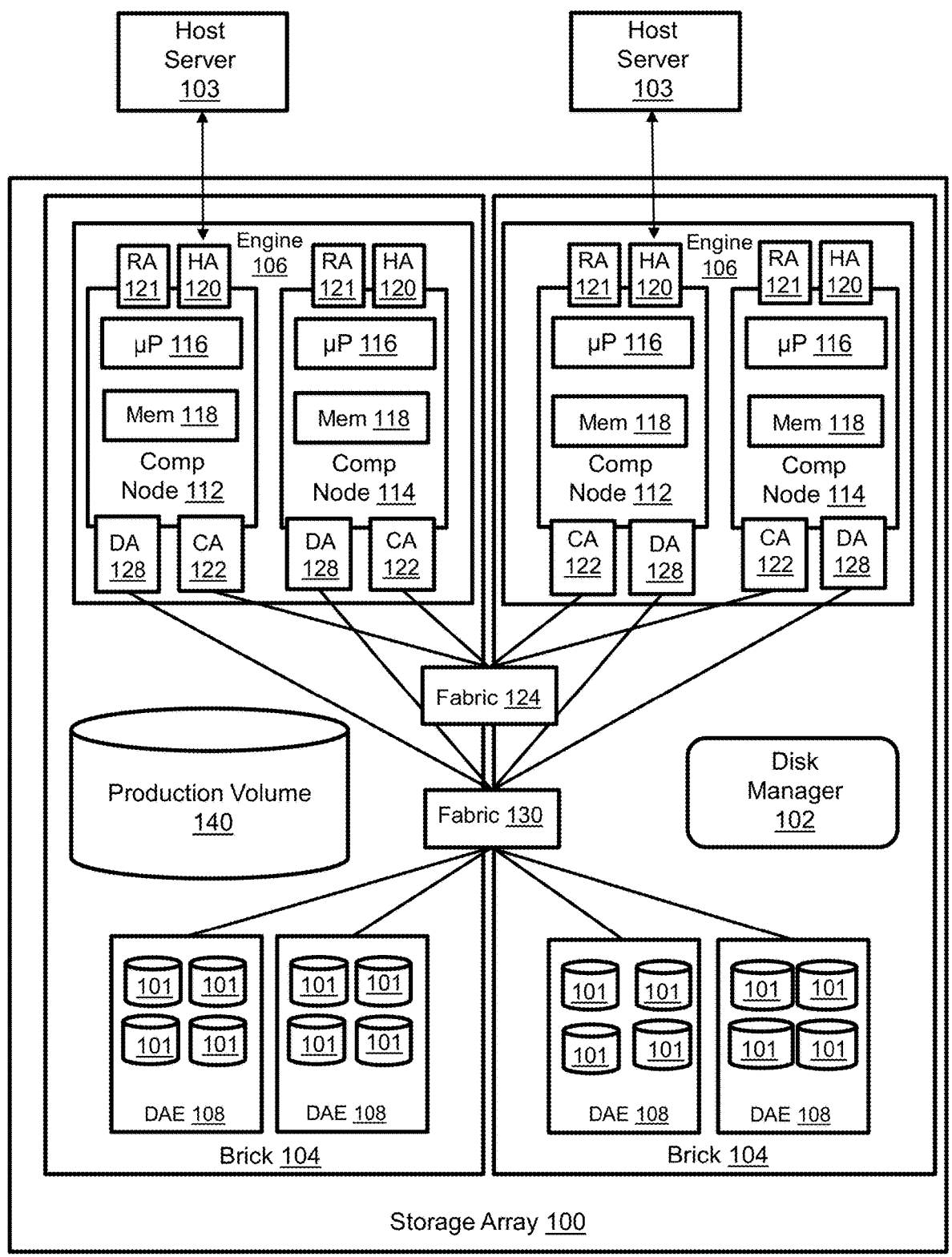
FIG. 1 illustrates a storage array with a disk manager that performs predictable protection group member distribution during expansion of storage capacity and performs validation of disk clusters based on the predictable protection group member distribution.

FIG. 1 illustrates a storage array 100 with a disk manager 102 that performs predictable deterministic protection group member distribution during expansion of storage capacity. The disk manager also performs validation of disk clusters based on the predictable deterministic protection group member distribution. The storage array is one example of a storage area network (SAN), which is one example of a data storage system in which the disk manager could be implemented. The storage array 100 is depicted in a simplified data center environment supporting two host servers 103 that run host applications. The storage array would typically support more than two host servers. The host servers 103 include volatile memory, non-volatile storage, and one or more tangible processors. The storage array 100 includes one or more bricks 104. Each brick includes an engine 106 and one or more disk array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed disks 101 in the DAEs 108. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed disks 101 include non-volatile storage media such as, without limitation, solid-state disks (SSDs) based on EEPROM technology such as NAND and NOR flash memory and hard disk disks (HDDs) with spinning disk magnetic storage media. Disk controllers may be associated with the managed disks as is known in the art. An interconnecting fabric 130 enables implementation of an N-way active-active backend. A back-end connection group includes all disk adapters that can access the same disk or disks. In some implementations every disk adapter 128 in the storage array can reach every DAE via the fabric 130. Further, in some implementations every disk adapter in the storage array can access every managed disk 101.

Data associated with instances of the hosted applications running on the host servers 103 is maintained on the managed disks 101. The managed disks 101 are not discoverable by the host servers but the storage array creates a logical storage device known as a production volume 140 that can be discovered and accessed by the host servers. Without limitation, the logical storage device may be referred to as a storage object, source device, production volume, production device, or production LUN, where the logical unit number (LUN) is a number used to identify logical storage volumes in accordance with the small computer system interface (SCSI) protocol. From the perspective of the host servers 103, the production volume 140 is a single disk having a set of contiguous fixed-size logical block addresses (LBAs) on which data used by the instances of the host application resides. However, the host application data is stored at non-contiguous addresses on various managed disks 101. The compute nodes maintain metadata that maps between the production volume 140 and the managed disks 101 in order to process IOs from the hosts.

Figure 2:
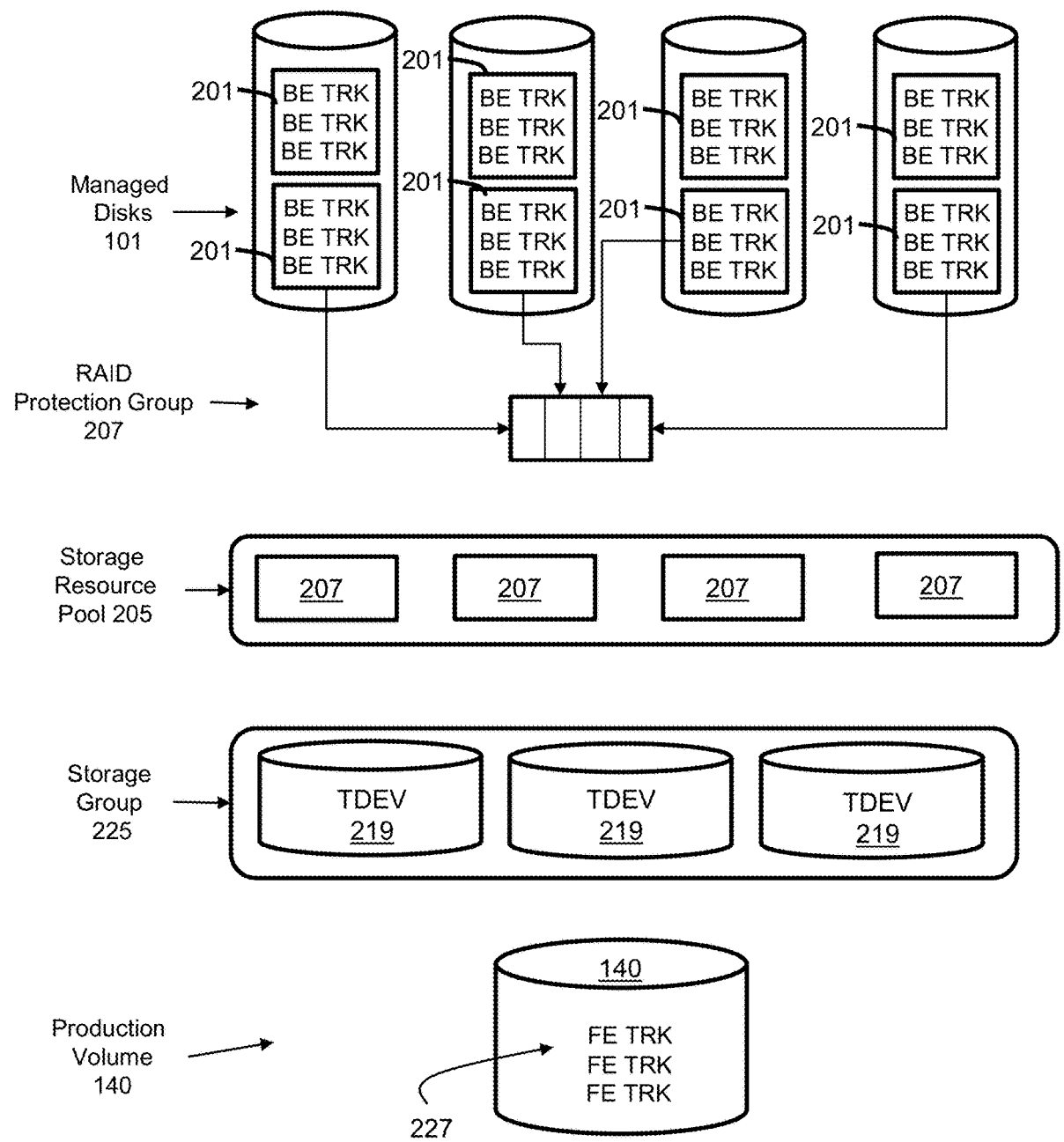
FIG. 2 illustrates layers of abstraction between the managed disks and the production volume of the storage array of FIG. 1.

FIG. 2 illustrates layers of abstraction between the managed disks 101 and the production volume 140. The basic allocation unit of storage capacity that is used by the compute nodes to access the managed disks 101 is a back-end track (BE TRK). In other words, the compute nodes do not access the managed disks using allocation units other than BE TRKs. BE TRKs all have the same fixed size which may be an integer (greater than 1) multiple of the managed disk sector size. The managed disks 101 are each organized into partitions or "splits" 201 of equal storage capacity, i.e., every split has the same fixed size. Each split 201 may include multiple BE TRKs. Selection of split storage capacity is a design implementation and, for context and without limitation, may be some fraction or percentage of the capacity of a managed disk equal to an integer multiple of the sector size. Each split may include a contiguous range of logical addresses. A group of splits from different managed disks is used to create a RAID protection group 207. In other words, the splits are protection group members and each split in a protection group must be on a different managed disk in order to be RAID compliant. In some implementations all of the managed disks associated with a RAID protection group have the same storage capacity. A storage resource pool 205 is a collection of RAID protection groups 207 of the same type, e.g., RAID-5 (3+1). Logical thin devices (TDEVs) 219 are created from a storage resource pool and organized into a storage group 225. The production volume 140 is created from one or more storage groups. Host application data is stored in front-end tracks (FE TRKs) 227, that may be referred to as blocks, on the production volume 140. The FE TRKs 227 on the production volume 140 are mapped to BE TRKs 200 of the managed disks 101 by metadata. The storage array may create and maintain multiple production volumes.

Figure 3:
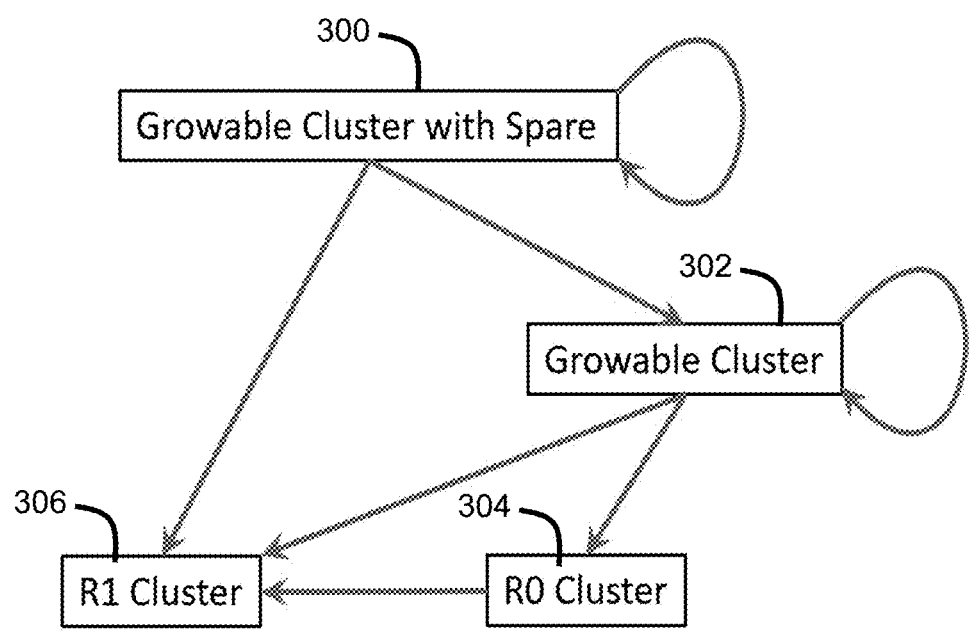
FIG. 3 illustrates expansion of storage capacity by adding new disks and creating new clusters via cluster division and transformation.

FIG. 3 illustrates expansion of the storage capacity of the storage array by adding new managed disks and creating new clusters via cluster division and transformation. The storage array may include multiple clusters and each managed disk belongs to only one cluster. In general, there are four types of disk clusters: a growable cluster with spare 300, a growable cluster without spare 302, a non-growable R0 cluster 304, and a non-growable R1 cluster 306. Starting with a growable cluster with spare 300, new disks can be added until there are enough total disks to enable a cluster split. The new disks may be added individually or in groups. When the growable cluster with spare 300 has enough disks to support a split, that cluster may then be divided (split) into a non-growable R1 cluster 306 and a growable cluster 302. More new disks can be added to the remaining growable cluster 302 until enough disks are available to split away a non-growable R0 cluster 304 or a non-growable R1 cluster 306. A smaller growable cluster 302 remains after the second split, i.e., when either a non-growable R0 cluster 304 or a non-growable R1 cluster 306 is split away from the growable cluster 302. A non-growable R0 cluster 304 can be transformed into a non-growable R1 cluster 306 depending on the need for spares. Individual RAID protection group members are distributed on the clusters in an algorithmically predictable manner so clusters of managed disks can subsequently be validated without recreating previous disk additions and cluster divisions and transformations. More specifically, a cluster can be validated based on the RAID protection group member numbers and member distribution within the cluster.

FIGS. 4 through 19 show the different types of disk clusters in greater detail, including cluster growth, division, and transformation. Each managed disk in a disk cluster has the same total storage capacity and is divided into the same number of equally sized splits, which may be partitions, for example, and without limitation. There are two types of splits: data splits and spare splits. Data splits are used to store data and parity of RAID protection group members. Spare splits are used for failure recovery, e.g., to rebuild failed protection group members. Some types of clusters do not include spare splits.

The clusters are represented by matrices. A RAID (D+P) protection group is composed of one split per disk over W disks, where RAID width W=D+P. Assuming the splits and disks are both sequentially indexed (e.g., starting from 0), a minimal disk cluster is represented by a matrix of W disks and W split indices. In accordance with well-known RAID requirements, no more than one member of a protection group is stored on a single disk.

Each representative matrix for a given cluster type follows the same deterministic protection group member distribution approach when assigning RAID members and thus has a predictable member distribution pattern. The illustrated examples show different types of disk clusters with RAID (4+1) protection groups. RAID groups are identified by capital letters such as A, B, C, etc. Individual protection group members are represented by numerals such as 0, 1, 2, 3, 4, etc. For example, the reference 3B represents member 3 of RAID group B. X is used as a reference for spare splits. There are two types of non-growable clusters: R0 and R1. An R0 cluster has W+0 disks in a predetermined pattern and an R1 cluster has W+1 disks in a predetermined pattern. A storage array includes only one growable cluster at a given point in time but may have multiple non-growable clusters. The growable cluster may or may not include spare splits. The protection group members of a growable cluster are distributed in accordance with one of two basic distribution patterns referred to as "modes" that are alternated as the growable cluster is divided into a smaller growable cluster and a non-growable cluster. The first basic distribution pattern is characterized by the member number matching the disk ordinal on the first W disks. The second basic distribution pattern is characterized by the member number matching the split index on the first W disks.

FIG. 4 illustrates a non-growable R0 cluster 400. Every R0 cluster has W disks and no spare splits. A RAID (4+1) implementation is shown so W=5. The five disks of the R0 cluster are represented by disk ordinals 0, 1, 2, 3, and 4. The cluster has a width W=5 and the five split indices are represented by index numerals 0, 1, 2, 3, and 4. The defining characteristic of an R0 cluster is a pattern in which the RAID group member numbers match the disk ordinals. For example, member 0 of each of RAID groups A, B, C, D, and E is on disk 0, while member 2 of each of RAID groups A, B, C, D, and E is on disk 2. An R0 cluster is generally not growable. However, an R0 cluster can be transformed into an R1 cluster with the addition of a new drive. An R1 cluster may be created from an R0 cluster when there is a need for spare splits. A storage array may have multiple R0 clusters at any point in time.

FIG. 5 illustrates a non-growable R1 cluster. Every R1 cluster has W+1 disks and includes spare splits. A RAID (4+1) implementation is shown so W+1=6. The six disks of the cluster are represented by disk ordinals 0, 1, 2, 3, 4, and 5. The cluster has a width W=5 and the five split indices are represented by index numerals 0, 1, 2, 3, and 4. The defining characteristics of an R1 cluster are that the member numbers match the disk ordinals for members on the first W disks except that for members on the last disk the member numbers equal W minus the split index. The result of application of the second part of the rule is that some of the members that would otherwise be on the first W disks are located on the last disk. For example, member 2 of each of RAID groups A, B, C, and E is on disk 2 because member number 2 matches disk ordinal 2, but member 2 of RAID group D is on disk 5 at split 3 because the difference between that disk ordinal and split index is 5−3=2. Similarly, member 4 of each of RAID groups A, C, D, and E is on disk 4 because member number 4 matches disk ordinal 4, but member 4 of RAID group B is on disk 5 at split 1 because the difference between that disk ordinal and split index is 5−1=4. Split 0 of disk 5 remains available because 5−0=5 and there are no members numbered 5. The available adjacent splits located along a diagonal of the matrix with incrementally decreasing disk ordinals and incrementally increasing splits resulting from the second part of the rule are designated as spare splits X. An R1 cluster may be created from an R0 cluster when there is a need for more spare splits. A storage array may have multiple R1 clusters at any point in time.

FIG. 6 illustrates a minimal mode 1 growable cluster with W disks 404. The mode 1 designation is characterized by a distribution pattern in which the member numbers match the disk ordinals on the first W disks. For example, member 4 of each of RAID groups A, B, C, D, and E is on disk 4 because member number 4 matches disk ordinal 4, and member 2 of each of RAID groups A, B, C, D, and E is on disk 2 because member number 2 matches disk ordinal 2. The mode 1 growable cluster has a minimum of W disks and can be scaled up (grown) by adding new disks, e.g., in increments of individual disks or multiple disks.

Figure 7:
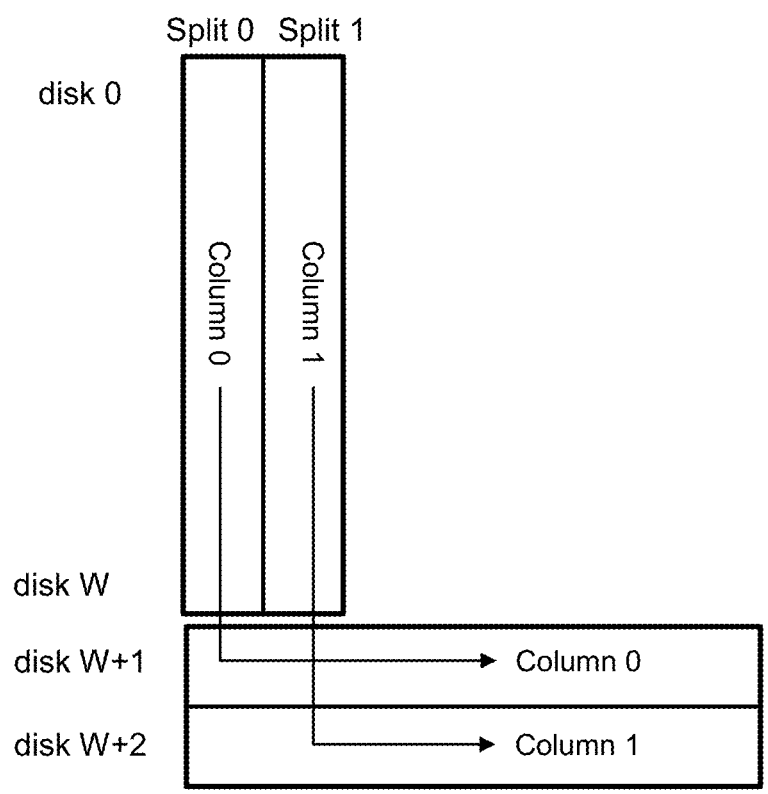
FIG. 7 illustrates rotation of selected members at a split index into disk ordinals of a new disk during cluster growth.

FIG. 7 illustrates rotation of the first W members of a split index into disk ordinals of a new disk that is added to a growable cluster. The new disks have the same capacity as the existing disks, are sequentially numbered relative to the existing disks in the cluster and are organized with the same number of splits as the existing disks. The two new disks shown in the example are integrated with the W original disks of the cluster by rotating data splits at selected index numbers of the W original disks onto the new disks. More specifically, for each new disk that is added to the cluster in ordered succession, the members of the W original disks at the lowest numbered unrotated split index are rotated onto the new disk such that the protection group member at disk n is moved to split n of the new drive. For example, the first new disk, i.e., disk W+1, is populated by rotating the members of split 0, disks 0 through W to splits 0 through W of disk W+1. Similarly, the second new disk, i.e., disk W+2, is populated by rotating the members of split 1, disks 0 through W to splits 0 through W of disk W+2. The splits that are vacated as a result of rotation are free space that may be used for creation of new protection groups. Member rotation is used to add disks to various types of growable clusters.

FIG. 8 illustrates a mode 1 growable cluster with W+3 disks 406. The members at splits 0, 1, and 2 of the first W disks (disks 0 through 4) have been rotated to splits 0 through 4 of new disks 5, 6, and 7, respectively. New RAID protection groups F, G, and H have been created in the splits that were vacated as a result of rotation. The members of the new protection groups F, G, and H are distributed in accordance with the mode 1 pattern because the members reside on the first W disks. For example, member 4 of each of RAID groups F, G, and H is on disk 4 because member number 4 matches disk ordinal 4, and member 2 of each of RAID groups F, G, and H is on disk 2 because member number 2 matches disk ordinal 2. For members on other disks, the member number matches the split index due to the rotations. Matching member number to split index on the additional disks is part of the predictable member distribution for mode 1 growable clusters.

FIG. 9 illustrates a mode 2 growable cluster with W disks 408. The mode 2 designation for a cluster with W disks is characterized by a distribution pattern in which the member numbers match the split indices. For example, member 4 of each of RAID groups A, B, C, D, and E is on split 4 because member number 4 matches split index 4, and member 2 of each of RAID groups A, B, C, D, and E is on split index 2 because member number 2 matches split index 2. The mode 2 growable cluster has a minimum of W disks and can be scaled up (grown) by adding new disks, e.g., in increments of individual disks or groups of disks.

FIG. 10 illustrates a mode 2 growable cluster with W+3 disks 410. The members at splits 0, 1, and 2 of the first W disks (disks 0 through 4) have been rotated to splits 0 through 4 of new disks 5, 6, and 7, respectively. New RAID protection groups F, G, and H have been created in the splits that were vacated as a result of rotation. The member distribution in a mode 2 growable cluster with greater than W disks is characterized by the following rules:

(1) For members on the first W disks:
if the split index is less than the number of additional disks (greater than W) then the member number matches the disk ordinal;
otherwise, the member number matches the split index.
(2) For members on other disks, the member number is the disk ordinal modulo RAID width.

In the illustrated example the number of additional disks relative to the RAID width W is 3. Consequently, on the first W disks the member numbers match the disk ordinals for split indices less than 3 but the member numbers match the split indices for split indices of 3 and greater. On additional disks 5 through 7 the member number is the disk ordinal modulo RAID width W.

FIG. 11 illustrates a minimal growable cluster with spare having W+1 disks 412. The distribution pattern is characterized by member numbers matching the disk ordinals on the first W disks except that on disk W+1 the member numbers match the split indices. The resulting available adjacent splits located along a diagonal of the matrix with incrementally decreasing disk ordinals and incrementally increasing splits are designated as spare splits X.

FIG. 12 illustrates a mode 1 growable cluster with spare grown to W+1+1 disks 414. As new disks are added to the mode 1 growable cluster with spare having W+1 disks, the data in the next lowest numbered unrotated split of disks 0 through W, starting with split 1, is rotated to the new disk, e.g., rotating members at disk ordinals 0 through 3 of split 1 to disk 6. Spare splits are not rotated. The vacated splits at index 1 on disks 0, 1, 2 and 3, together with split 4 on the new disk 5 allows a new RAID group F to be created. For new RAID group F, the members on existing disks (disks 0, 1, 2, and 3) are distributed such that the member numbers match the disk ordinals, while the member on the new disk (disk 6) has a member number that matches the split index. The cluster can continue to grow in accordance with these member distribution rules until there are 2*W disks. FIG. 13 illustrates a mode 1 growable cluster with spare having 2*W disks 416.

Figure 14:
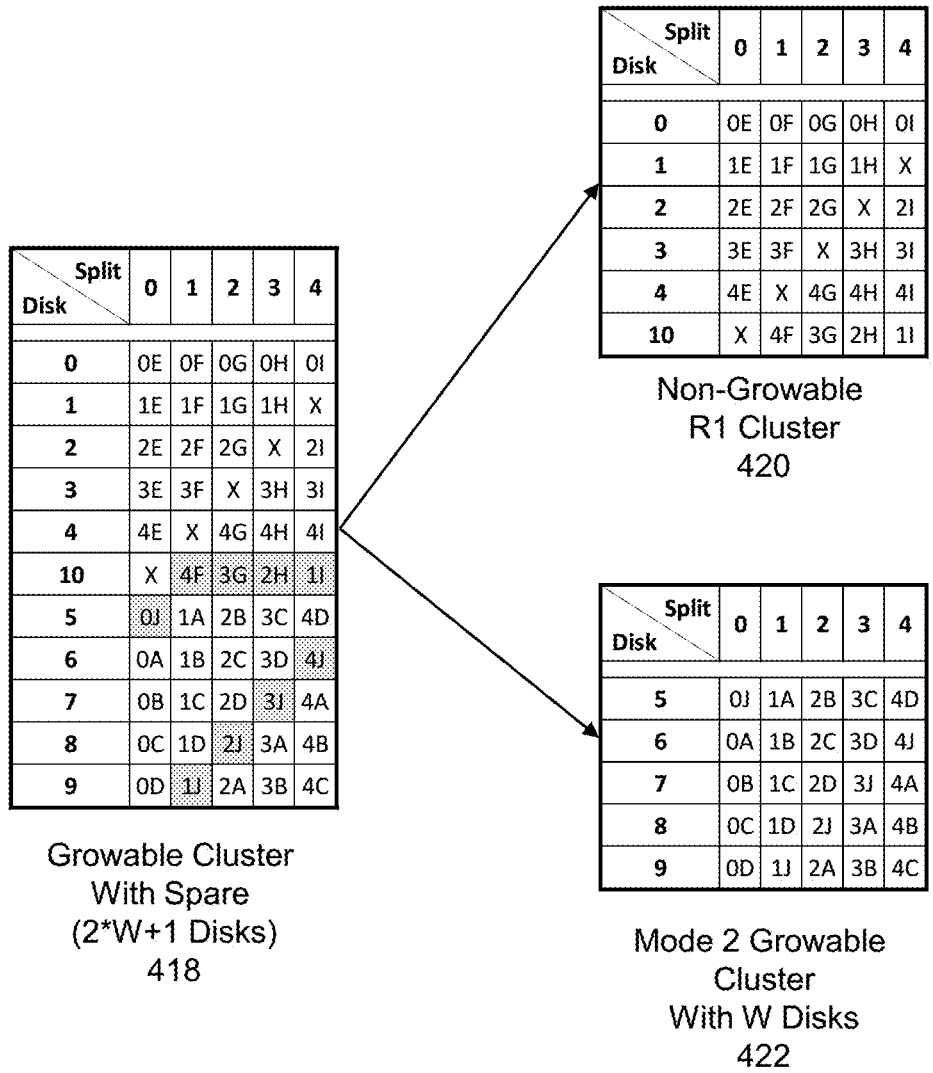
FIG. 14 illustrates division of a growable cluster with spare grown to 2*W+1 disks into a non-growable R1 cluster with W+1 disks and a mode 2 growable cluster with W disks.

FIG. 14 illustrates division of a growable cluster with spare having 2*W+1 disks 418 into a non-growable R1 cluster 420 and a mode 2 growable cluster with W disks 422. When the last new disk, which is the disk with ordinal 10 in the illustrated example, is added to the mode 1 growable cluster with spare having 2*W disks 416 (FIG. 13), the last new disk takes the W+1 position and the new members created on disks 6 through 9, i.e., members 4F, 3G, 2H and 1I, are moved onto the last new disk. The vacated splits, along with the spare split on disk 5, are used to form a new RAID group J. The first split on disk 10 becomes a spare split X. For the new RAID group J, the member numbers match the split indices. Disks 0, 1, 2, 3, 4, and 10 are split away to form the non-growable R1 cluster 420. The remaining disks, which are disks 5, 6, 7, 8, and 9 in the illustrated example, form a growable cluster with the mode 2 pattern and no spares.

The mode 2 growable cluster with W disks 422 can grow with the addition of new disks and eventually be divided when there are 2*W disks. FIG. 15 illustrates a mode 2 growable cluster with W+1 disks that results from adding a new disk to the mode 2 growable cluster with W disks 422 (FIG. 14). The members of the first W disks at the lowest numbered unrotated split are rotated onto the new disk so in the illustrated example the members at split 0 of disks 5 through 9 are rotated onto disk 11. A new RAID protection group K is formed in the vacated splits. The member numbers of new RAID protection group K are matched to the disk ordinals (after splitting away the mode 2 growable cluster with W disks 422 (FIG. 14) disks 5 through 9 are reassigned disk ordinals 0 through 4). FIG. 16 illustrates a mode 2 growable cluster with 2*W disks 426 resulting from addition of W new disks to the mode 2 growable cluster with W disks 422 (FIG. 14).

FIG. 17 illustrates a non-growable R0 cluster 428 and mode 1 growable cluster with W disks 430 resulting from division of the mode 2 growable cluster with 2*W disks 426 (FIG. 16). If there is no longer a need of an R1 cluster to distribute spare capacity, then disks 5 through 9 can be split off as R0 cluster 428. Remaining disks 11 through 15 form a growable cluster of W disks in which the member numbers match the disk ordinals (after splitting away the R0 cluster disks 11 through 15 are assigned disk ordinals 0 through 4).

Figure 18:
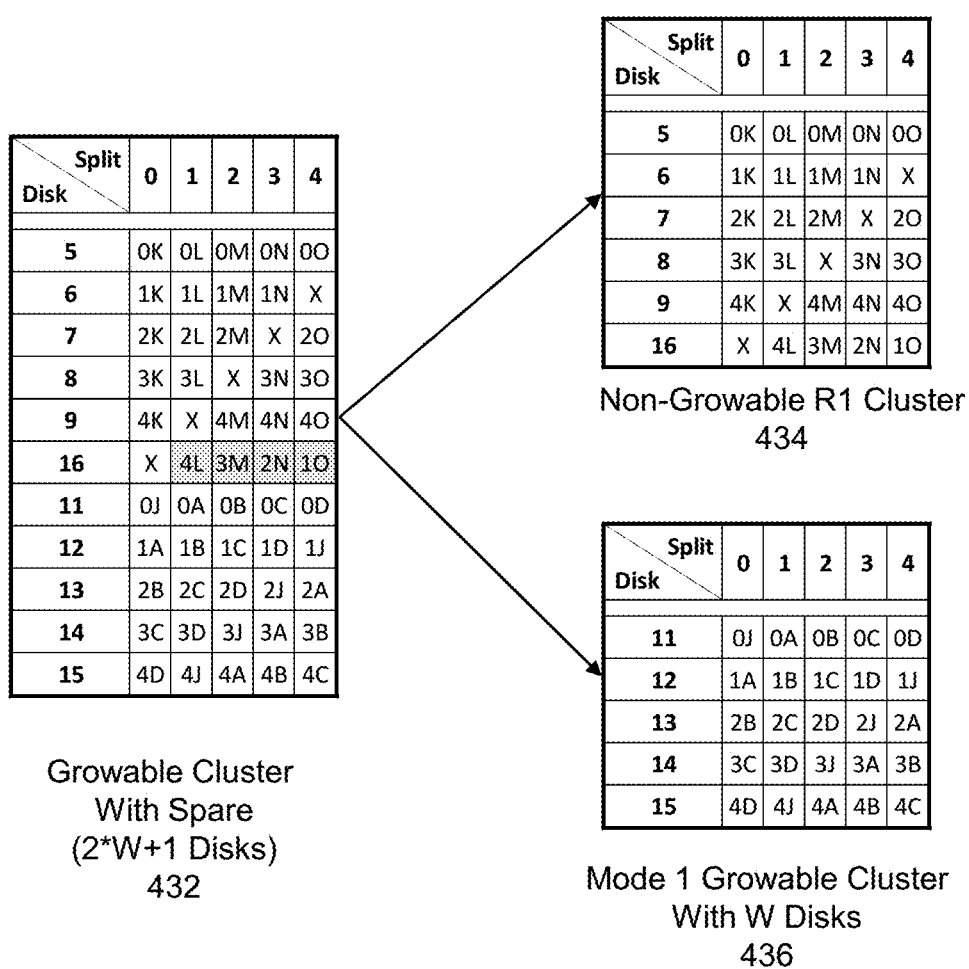
FIG. 18 illustrates division of a mode 2 growable cluster with spare having 2*W+1 disks into a non-growable R1 cluster and a mode 1 growable cluster with W disks.

FIG. 18 illustrates division of a mode 2 growable cluster with spare having 2*W+1 disks 432 into a non-growable R1 cluster 434 and a mode 1 growable cluster with W disks 436. If there is still a need for an R1 cluster to further distribute spare capacity, then another new disk is added (disk 16 in the illustrated example) at the W+1+1 position. Data from the diagonal splits on disks 6, 7, 8 and 9 is moved to the new disk. The freed up diagonal splits, plus the first split on the new disk, are reserved as spare splits X. Disks 5 through 9 and 16 are then then split off as R1 cluster 434. Remaining disks 11 through 15 form the mode 1 growable cluster with W disks 436. Cluster growth can continue with the growable cluster 436, with R1 clusters or R0 clusters being split off as needed.

Figure 19:
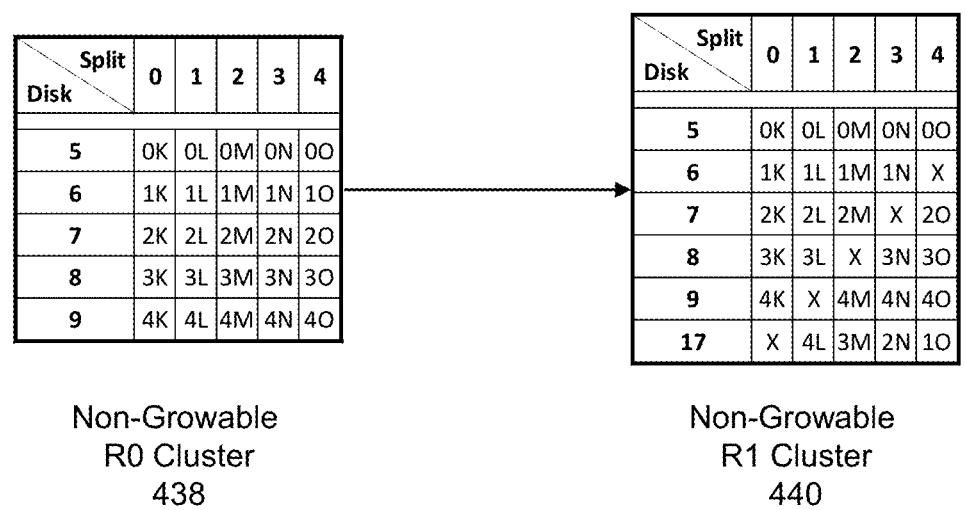
FIG. 19 illustrates transformation of a non-growable R0 cluster into a non-growable R1 cluster.

FIG. 19 illustrates transformation of a non-growable R0 cluster 438 into a non-growable R1 cluster 440. When there is a need for spare capacity and the disk array contains one or more R0 clusters, then any of the R0 clusters can be converted into R1 clusters with the addition of one new disk. The spare splits X are located on adjacent splits starting with split 0 of the new disk along a diagonal of the matrix with incrementally decreasing disk ordinals and incrementally increasing split indexes. The data members already located in those positions are moved to the same split index of the new disk.

Figure 20:
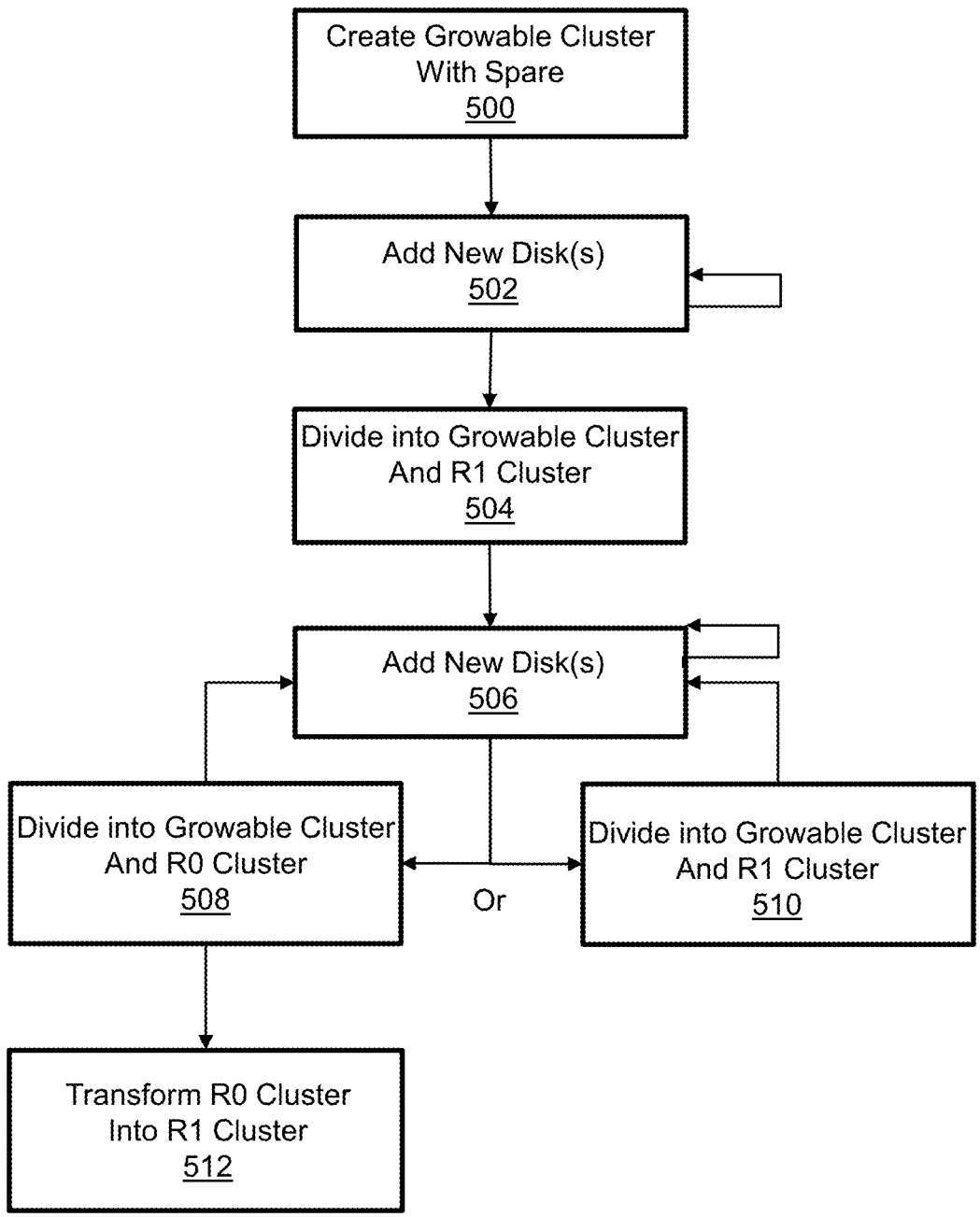
FIG. 20 illustrates steps associated with predictable protection group member assignments during expansion of storage capacity.

FIG. 20 illustrates steps associated with predictable protection group member assignments during expansion of storage capacity. The order in which the steps are shown should not be viewed as a limitation and individual steps may be optional. Step 500 is creating a growable cluster with spare. The growable cluster with spare has at least W+1 disks and may implement either a mode 1 or a mode 2 member distribution pattern. The mode 1 member distribution pattern is characterized by the member numbers matching the disk ordinals on the first W disks except that on disk W+1 the member numbers match the split indices. The resulting available adjacent splits located along a diagonal of the matrix with incrementally decreasing disk ordinals and incrementally increasing splits are designated as spare splits X. The mode 2 distribution pattern is characterized by two rules. For members on the first W disks: if the split index is less than the number of additional disks, then the member number matches the disk ordinal; otherwise, the member number matches the split index. For members on other disks the member number matches the disk ordinal modulo RAID width. Step 502 is adding new disks. New disks can be added iteratively until there are 2*W+1 disks in the growable cluster with spare. The new disks may be added individually or in groups. When the growable cluster with spare has 2*W+1 disks that cluster may then be divided (split). Step 504 is dividing the growable cluster with spare into a non-growable R1 cluster having W+1 disks and a growable cluster having W disks. The R1 cluster is not growable. Step 506 is adding new disks to the remaining growable cluster having W disks. New disks can be added until there are 2*W or 2*W+1 disks in the growable cluster with spare. The new disks may be added iteratively and individually or in groups. A growable cluster with 2*W disks can be divided into a smaller growable cluster and an R0 cluster, each having W disks, as indicated in step 508. A growable cluster with 2*W+1 disks can be divided into a smaller growable cluster with W disks and an R1 cluster with W+1 disks, as indicated in step 510. Either step 508 or step 510 can follow step 506. The smaller growable cluster resulting from cluster division in step 508 and step 510 can be grown by adding new disks in step 506 and divided again, any number of times. Optional step 512 is transforming an R0 cluster into an R1 cluster by adding a new disk and creating spares.

Figure 21:
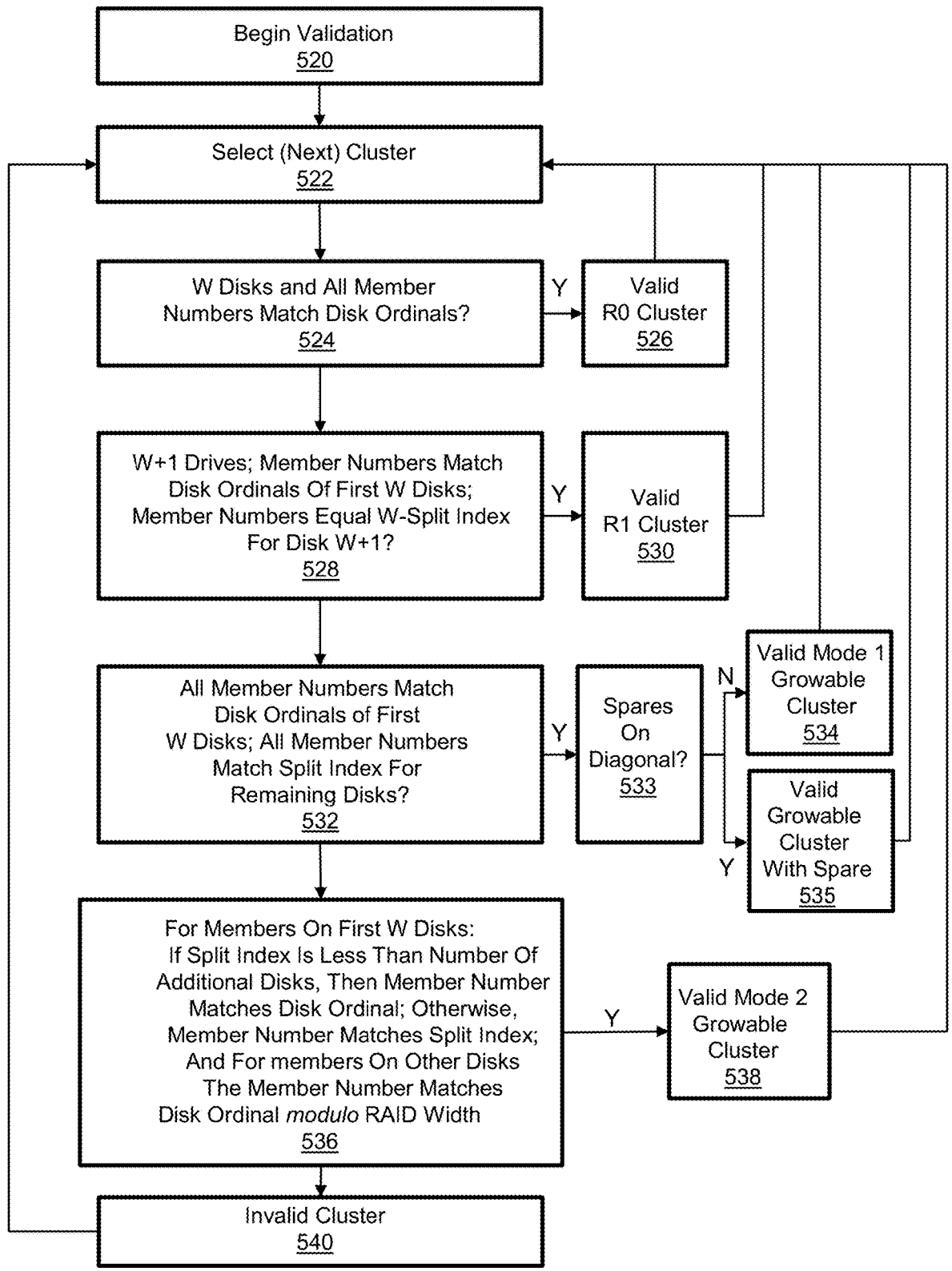
FIG. 21 illustrates steps associated with validation based on the predictable protection group member assignments.

FIG. 21 illustrates steps associated with validation based on the predictable protection group member assignments. Validation begins at step 520. Step 522 is selecting a (next) cluster to validate. Step 524 is determining whether the selected cluster has W disks and all RAID protection group member numbers match the disk ordinals. If step 524 evaluates to "yes" then the selected cluster is determined to be a valid R0 cluster as indicated in step 526 and the next cluster is selected as indicated in step 522. If step 524 does not evaluate to "yes" then step 528 is determining whether the selected cluster has W+1 disks, the RAID protection group member numbers match the disk ordinals on the first W disks, and the member numbers equal the difference between W and the split index for the other disk as indicated in step 528. If step 528 evaluates to "yes" then the selected cluster is determined to be a valid R1 cluster as indicated in step 530 and the next cluster is selected as indicated in step 522. If step 528 does not evaluate to "yes" then step 532 is determining whether the selected cluster exhibits a distribution pattern in which the member numbers match the disk ordinals on the first W disks and the member numbers match the split indices on any other disks. If step 532 evaluates to "yes" then step 533 is determining whether there are spare splits distributed along a diagonal with adjacency. If step 533 evaluates to "no" then the selected cluster is determined to be a valid mode 1 growable cluster as indicated in step 534 and the next cluster is selected as indicated in step 522. If step 533 evaluates to "yes" then the selected cluster is determined to be a valid growable cluster with spare as indicated in step 535 and the next cluster is selected as indicated in step 522. If step 532 does not evaluate to "yes" then step 536 is determining whether the selected cluster exhibits a distribution pattern in which member numbers on the first W disks match the disk ordinals if the split index is less than the number of additional disks, and otherwise the member numbers match the split indices, and for members on other disks the member numbers match the disk ordinal modulo RAID width. If step 536 evaluates to "yes" then the selected cluster is determined to be a valid mode 2 growable cluster as indicated in step 538 and the next cluster is selected as indicated in step 522. If step 536 does not evaluate to "yes" then step 540 is declaring the selected cluster to be invalid. The next cluster is then selected as indicated in step 522. The process continues iteratively until all clusters have been declared valid or invalid.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a storage array comprising:
at least one compute node comprising at least one processor and non-transitory computer-readable memory;
a plurality of data storage disks that are accessed by the at least one compute node and used to store data that is accessed via the at least one compute node, each disk having W indexed splits, each split having a fixed-size amount of storage capacity equal to storage capacity of other splits; and
a disk manager configured to:
create a growable disk cluster with spare from W+1 numbered ones of the disks by creating redundant arrays of independent disks (RAID) protection groups each having D+P=W numbered RAID protection group members comprising D data members and P parity members, and distributing the protection group members in one of the following modes:
mode 1: member numbers match disk ordinals on the first W disks and member numbers match split indices on other disks and those splits that do not contain one of the protection group members are designated as spare splits and for each additional disk that is added to the mode 1 pattern in ordered succession the members of the first W disks at the lowest numbered unrotated split index are rotated onto the additional disk such that the protection group member at disk n is moved to split n of the additional disk; and mode 2: for members on the first W disks, if the split index is less than a number of additional disks greater than W then the member number matches the disk ordinal, and otherwise the member number matches the split index; and for members on other disks, the member number is the disk ordinal modulo RAID width; and designating as spare splits those splits that do not contain one of the protection group members;

grow the growable disk cluster with spare by adding new ones of the disks and rotating members at lowest numbered unrotated split indices onto the new disks; and validate the growable disk cluster with spare by determining that the member numbers match one of the patterns.

2. The apparatus of claim 1 wherein the disk manager is configured to divide the growable disk cluster with spare into a growable cluster without spare and a non-growable R1 cluster when the growable disk cluster with spare has 2*W+1 disks due to disk addition, the non-growable R1 cluster comprising ones of the disks selected such that member numbers match the disk ordinals for members on the first W disks except that for members on the last disk the member number is equal to W minus the split index, and the growable cluster without spare comprising ones of the disks selected such that the protection group members are distributed in one of the patterns.

3. The apparatus of claim 2 wherein the disk manager is configured to grow the growable disk cluster without spare by adding new ones of the disks and rotating members at lowest numbered unrotated split indices onto the new disks; and validate the growable disk cluster without spare by determining that the member numbers match one of the patterns.

4. The apparatus of claim 3 wherein the disk manager is configured to divide the growable disk cluster without spare into a smaller growable cluster without spare and a non-growable R0 cluster when the growable disk cluster with spare has 2*W disks due to disk addition, the non-growable R0 cluster comprising ones of the disks selected such that the member numbers match the disk ordinals, and the growable cluster without spare comprising ones of the disks selected such that the protection group members are distributed in one of the patterns.

5. The apparatus of claim 4 wherein the disk manager is configured to validate the smaller growable disk cluster without spare by determining that the member numbers match one of the patterns.

6. The apparatus of claim 3 wherein the disk manager is configured to divide the growable disk cluster without spare into a smaller growable cluster without spare and a non-growable R1 cluster when the growable disk cluster with spare has 2*W+1 disks due to disk addition, the non-growable R1 cluster comprising ones of the disks selected such that the member numbers match the disk ordinals for members on the first W disks except that for members on the last disk the member number is equal to W minus the split index, and the growable cluster without spare comprising ones of the disks selected such that the protection group members are distributed in one of the patterns.

7. The apparatus of claim 6 wherein the disk manager is configured to validate the smaller growable disk cluster without spare by determining that the member numbers match one of the patterns.

8. A method implemented by a storage array comprising at least one compute node comprising at least one processor and non-transitory computer-readable memory and a plurality of data storage disks that are accessed by the at least one compute node and used to store data that is accessed via the at least one compute node, each disk having W indexed splits, each split having a fixed-size amount of storage capacity equal to storage capacity of other splits, the method comprising:

creating a growable disk cluster with spare from W+1 numbered ones of the disks by creating redundant arrays of independent disks (RAID) protection groups each having D+P=W numbered RAID protection group members comprising D data members and P parity members, and distributing the protection group members in one of the following modes:

mode 1: member numbers match disk ordinals on the first W disks and member numbers match split indices on other disks and those splits that do not contain one of the protection group members are designated as spare splits and for each additional disk that is added to the mode 1 pattern in ordered succession the members of the first W disks at the lowest numbered unrotated split index are rotated onto the additional disk such that the protection group member at disk n is moved to split n of the additional disk; and mode 2: for members on the first W disks, if the split index is less than a number of additional disks greater than W then the member number matches the disk ordinal, and otherwise the member number matches the split index; and for members on other disks, the member number is the disk ordinal modulo RAID width; and designating as spare splits those splits that do not contain one of the protection group members;

growing the growable disk cluster with spare by adding new ones of the disks and rotating members at lowest numbered unrotated split indices onto the new disks; and validating the growable disk cluster with spare by determining that the member numbers match one of the patterns.

9. The method of claim 8 comprising dividing the growable disk cluster with spare into a growable cluster without spare and a non-growable R1 cluster when the growable disk cluster with spare has 2*W+1 disks due to disk addition, the non-growable R1 cluster comprising ones of the disks selected such that the member numbers match the disk ordinals for members on the first W disks except that for members on the last disk the member number is equal to W minus the split index, and the growable cluster without spare comprising ones of the disks selected such that the protection group members are distributed in one of the patterns.

10. The method of claim 9 comprising: growing the growable disk cluster without spare by adding new ones of the disks and rotating members at lowest numbered unrotated split indices onto the new disks; and validating the growable disk cluster without spare by determining that the member numbers match one of the patterns.

11. The method of claim 10 comprising dividing the growable disk cluster without spare into a smaller growable cluster without spare and a non-growable R0 cluster when the growable disk cluster with spare has 2*W disks due to disk addition, the non-growable R0 cluster comprising ones of the disks selected such that the member numbers match the disk ordinals, and the growable cluster without spare comprising ones of the disks selected such that the protection group members are distributed in one of the patterns.

12. The method of claim 11 comprising validating the smaller growable disk cluster without spare by determining that the member numbers match one of the patterns.

13. The method of claim 10 comprising dividing the growable disk cluster without spare into a smaller growable cluster without spare and a non-growable R1 cluster when the growable disk cluster with spare has 2*W+1 disks due to disk addition, the non-growable R1 cluster comprising ones of the disks selected such that the member numbers match the disk ordinals for members on the first W disks except that for members on the last disk the member number is equal to W minus the split index, and the growable cluster without spare comprising ones of the disks selected such that the protection group members are distributed in one of the patterns.

14. The method of claim 13 comprising validating the smaller growable disk cluster without spare by determining that the member numbers match one of the patterns.

15. A computer-readable storage medium storing instructions that when executed by a storage array comprising at least one compute node comprising at least one processor and non-transitory computer-readable memory and a plurality of data storage disks that are accessed by the at least one compute node and used to store data that is accessed via the at least one compute node, each disk having W indexed splits, each split having a fixed-size amount of storage capacity equal to storage capacity of other splits, cause the compute node to perform a method for creating and validating disk clusters, the method comprising:
  creating a growable disk cluster with spare from W+1 numbered ones of the disks by creating redundant arrays of independent disks (RAID) protection groups each having D+P=W numbered RAID protection group members comprising D data members and P parity members, and distributing the protection group members in one of the following modes:
    mode 1: member numbers match disk ordinals on the first W disks and member numbers match split indices on other disks and those splits that do not contain one of the protection group members are designated as spare splits and for each additional disk that is added to the mode 1 pattern in ordered succession the members of the first W disks at the lowest numbered unrotated split index are rotated onto the additional disk such that the protection group member at disk n is moved to split n of the additional disk; and
    mode 2: for members on the first W disks, if the split index is less than a number of additional disks greater than W then the member number matches the disk ordinal, and otherwise the member number matches the split index; and for members on other disks, the member number is the disk ordinal modulo RAID width; and designating as spare splits those splits that do not contain one of the protection group members;
  growing the growable disk cluster with spare by adding new ones of the disks and rotating members at lowest numbered unrotated split indices onto the new disks; and
  validating the growable disk cluster with spare by determining that the member numbers match one of the patterns.

16. The computer-readable storage medium of claim 15 wherein the method further comprises dividing the growable disk cluster with spare into a growable cluster without spare and a non-growable R1 cluster when the growable disk cluster with spare has 2*W+1 disks due to disk addition, the non-growable R1 cluster comprising ones of the disks selected such that the member numbers match the disk ordinals for members on the first W disks except that for members on the last disk the member number is equal to W minus the split index, and the growable cluster without spare comprising ones of the disks selected such that the protection group members are distributed in one of the patterns.

17. The computer-readable storage medium of claim 16 wherein the method further comprises: growing the growable disk cluster without spare by adding new ones of the disks and rotating members at lowest numbered unrotated split indices onto the new disks; and validating the growable disk cluster without spare by determining that the member numbers match one of the patterns.

18. The computer-readable storage medium of claim 17 wherein the method further comprises dividing the growable disk cluster without spare into a smaller growable cluster without spare and a non-growable R0 cluster when the growable disk cluster with spare has 2*W disks due to disk addition, the non-growable R0 cluster comprising ones of the disks selected such that the member numbers match the disk ordinals, and the growable cluster without spare comprising ones of the disks selected such that the protection group members are distributed in one of the patterns.

19. The computer-readable storage medium of claim 18 wherein the method further comprises validating the smaller growable disk cluster without spare by determining that the member numbers match one of the patterns.

20. The computer-readable storage medium of claim 17 wherein the method further comprises dividing the growable disk cluster without spare into a smaller growable cluster without spare and a non-growable R1 cluster when the growable disk cluster with spare has 2*W+1 disks due to disk addition, the non-growable R1 cluster comprising ones of the disks selected such that the member numbers match the disk ordinals for members on the first W disks except that for members on the last disk the member number is equal to W minus the split index, and the growable cluster without spare comprising ones of the disks selected such that the protection group members are distributed in one of the patterns.

* * * * *